United States Patent
Medberry et al.

(10) Patent No.: US 6,778,740 B2
(45) Date of Patent: Aug. 17, 2004

(54) ALIGNMENT OF OPTICAL FIBER ELEMENTS

(75) Inventors: John Bernard Medberry, Windsor, CO (US); Benno Guggenheimer, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 199 days.

(21) Appl. No.: 10/208,873

(22) Filed: Jul. 31, 2002

(65) Prior Publication Data

US 2004/0022498 A1 Feb. 5, 2004

(51) Int. Cl.[7] .................................................. G02B 6/26
(52) U.S. Cl. ........................ 385/52; 385/15; 356/335; 356/336; 356/337
(58) Field of Search ............................................ 385/52

(56) References Cited

U.S. PATENT DOCUMENTS 4,376,886 A * 3/1983 Sciaky et al. .......... 219/121.14
5,587,786 A * 12/1996 Champagne et al. ....... 356/121
6,144,446 A * 11/2000 Nagasaki et al. ......... 356/237.3
2001/0055006 A1 * 12/2001 Sano et al. .................. 345/175

* cited by examiner

Primary Examiner—John D. Lee
Assistant Examiner—Jennifer Doan

(57) ABSTRACT

Fiber optic alignment methods and apparatus in accordance with the present invention first identify a target beam width incidence on an end of an optical element. The end of the optical element is placed into a beam of light at an axial location relative to the beam of light. The end of the optical element is subsequently moved transversally (perpendicular) to the beam of light until a position of maximum optical power, as measured through the optical element, is identified. A beam width of the beam of light is measured at that axial location. The movement and measurement sequence is repeated at multiple axial locations relative to the beam of light. Linear regression, or an equivalent approach is used, to predict an axial location relative to the beam of light with the target beam width. The end of the optical element is then moved to the axial location with the target beam width.

20 Claims, 4 Drawing Sheets

ALIGNMENT OF OPTICAL FIBER ELEMENTS

FIELD OF THE INVENTION

This invention relates generally to the field of fiber optics. More particularly, this invention relates to high-resolution axial and radial distance alignment of an optical fiber element to another optical fiber element.

BACKGROUND OF THE INVENTION

In the field of fiber optics, problems exist with the physical alignment of two optical elements. Prior solutions to aligning optical fiber and optical fiber arrays generally rely upon detection of a physical edge of a first fiber with a camera, force feedback, or linear encoding. These methods inherently require reliance on assumptions about the location of a second optical element, be it an optical fiber, waveguide, or other optical component relative to the edge of the first fiber that was detected. All final alignment of the axial distance and radial position is dependent upon the accuracy of these assumptions. These assumptions can result in uncertainty with respect to the final axial distance and radial alignment of the two optical elements. This uncertainty imposes limitations on these techniques.

BRIEF SUMMARY OF THE INVENTION

The present invention relates generally to axial distance and radial distance alignment of an optical fiber element to another optical fiber element. These optical fiber elements can include, but are not limited to, optical fiber strands, optical fiber arrays, optical fiber cables, optical filters, optical amplifiers, optical waveguide devices, etc. Objects, advantages and features of the invention will become apparent to those skilled in the art upon consideration of the following detailed description of the invention.

In accordance with certain embodiments consistent with the present invention, fiber optic alignment methods and apparatus in accordance with the present invention first identify a target beam width incidence on an end of an optical element. The end of the optical element is placed into a beam of light at an axial location relative to the beam of light. The end of the optical element is subsequently moved transversally (perpendicular) to the beam of light until a position of maximum optical power, as measured through the optical element, is identified. A beam width of the beam of light is measured at that axial location. The movement and measurement sequence is repeated at multiple axial locations relative to the beam of light. Linear regression, or an equivalent approach is used, to predict an axial location relative to the beam of light with the target beam width. The end of the optical element is then moved to the axial location with the target beam width.

In accordance with certain embodiments consistent with the present invention, a method of fiber optic alignment, wherein a target beam width of a beam of light is defined along a path of the beam of light on a first end of a fiber optic element, and wherein the fiber optic element is situated with light incident upon the first end of the fiber optic element, involves measuring a beam width at multiple locations axially relative to said beam of light; calculating a location axially relative to said beam of light wherein said beam of light has a beam width that equals said target beam width of said beam of light; and moving said fiber optic element to said location. This method and other methods disclosed herein can be carried out using instructions stored on an electronic storage medium that are executed on a programmed processor.

In accordance with certain embodiments consistent with the present invention, an apparatus for fiber optic alignment, consistent with certain embodiments of the present invention has a control processor. A first end of a fiber optic element is moved within a beam of light responsive to the control processor. Optical power transmitted through the fiber optic element is measured at a second end of the fiber optic element and the measurement is provided to the control processor. The control processor carries out instructions that measure a beam width at multiple locations axially relative to the beam of light; calculate a location axially relative to the beam of light wherein the beam of light has a beam width that equals the target beam width of the beam of light; and move the fiber optic element to the location.

Many variations, equivalents and permutations of these illustrative exemplary embodiments of the invention will occur to those skilled in the art upon consideration of the description that follows. The particular examples above should not be considered to define the scope of the invention.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
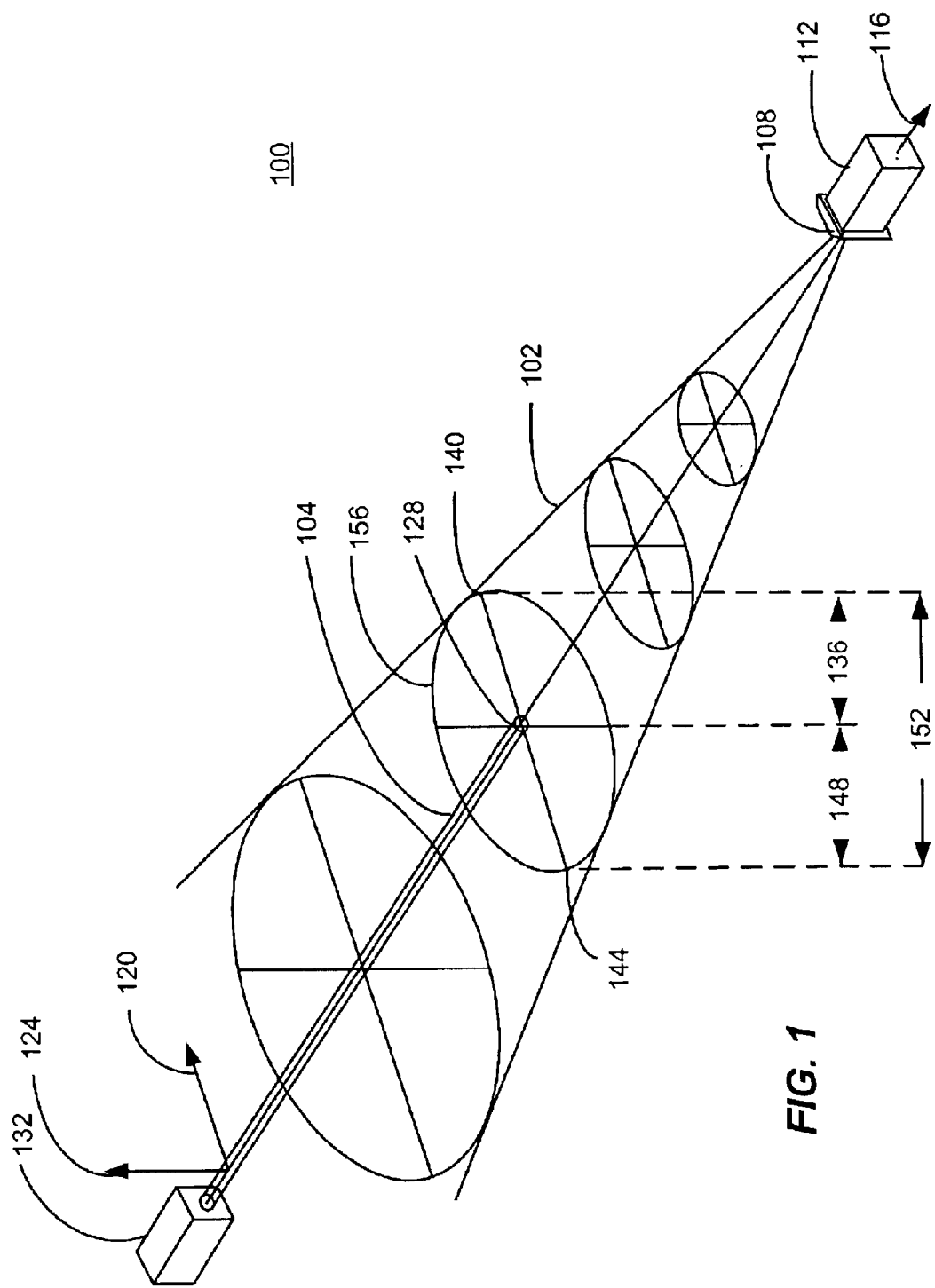
FIG. 1 is a drawing depicting a coordinate system and its relation to fiber optic elements consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

For the purposes of this discussion, it should be noted that the term "optical element" as used in this discussion can refer to an embodiment of an optical fiber strand, optical fiber arrays, optical fiber cables, optical filters, optical amplifiers, optical waveguide devices, or any other optical component that can exist in an optical system that can be used to transmit, carry, manipulate, or receive optical energy.

Turning now to FIG. 1, a fiber optic alignment scenario 100 is illustrated. In this exemplary embodiment of the present invention, a beam of light 102 is shown. Linear regression using measurements of optical power within the beam of light 102 can be used to iteratively refine the axial distance between and radial alignment of a first end of a first movable optical element 104 and a second fixed optical element 108. The optical power through the optical element pair is optimized as a function of transverse (radial) alignment. The optimization of the transverse alignment of the optical element pair yields a position, in a plane perpendicular to the beam of light 102, of the first end of the first movable optical element 104 relative to the second fixed optical element 108 that corresponds to a maximum of through optical power. The axial separation corresponds to a previously calibrated value for the beam width at the first end of the first movable optical element 104 using the physical characteristics of the optical system including the optical elements, the transmitter, and the receiver.

It should be noted and will be clear to one skilled in the art upon consideration of this teaching that the first optical element 104 can be fixed and the second optical element 108 can be moveable, or both may move in relation to one another, without departing from this invention and that they should be considered equivalent for the purposes of this discussion. As well, it should be noted and will be clear to one skilled in the art upon consideration of this teaching that interpolation, extrapolation, or any other appropriate estimation or prediction method can be substituted for the linear regression mentioned above and elsewhere within this text without departure from this invention.

Initially, the first end of the first moveable optical element 104 can be arbitrarily placed axially relative to the second fixed optical element 108 so that a beam (cone) of light 102 can be coupled from the second fixed optical element 108 into the first end of the first moveable optical element 104. The beam of light 102 can be coupled using a transmitter 112 situated such that optical power is transmitted through the second fixed optical element 108 and directed axially toward and into the first end of the first moveable optical element 104. For the purposes of this discussion, a Z-axis 116 shall be defined to be situated along the line of maximum (peak) optical power created within the cone defined by the beam of light 102. The Z-axis 116 shall be defined as increasingly positive in the direction toward the origin of the beam of light 102. An X-axis 120 and Y-axis 124 shall be defined as perpendicular (normal) to each other and perpendicular (normal) to the Z-axis 116. The X-axis 120 and Y-axis 124 shall be defined to have their origins on the Z-axis 116 and to be increasing in magnitude (positive in one direction and negative in the opposite direction) as they move away from the Z-axis 116.

As well, for the purposes of this discussion, the term "transverse" shall be used to identify a direction or movement that is perpendicular to the Z-axis 116. A transverse plane, then, shall be defined as a plane that is perpendicular to the Z-axis 116 at any Z location (position). Is should be noted that the X-axis 120 and Y-axis 124 together can represent just such a transverse plane relative to the Z-axis 116 situated at the location where Z equals zero. In this example, the use of the Cartesian coordinate system is used. It should also be noted that any other coordinate system can be chosen without departing from this invention, and that any suitable coordinate system can be used, including, but not limited to polar, spherical, etc.

With the coordinate system chosen, the first end of the first moveable optical element 104 can be moved in a transverse plane at that Z location to identify the position of maximum (peak) optical power 128. Given the above definition of the coordinate system, the position of maximum (peak) optical power 128 lies directly on the Z-axis 116. The identification of the position of maximum optical power 128 is done by measurement using an optical receiver and data acquisition unit 132 connected to a second end of the first moveable optical element 104 opposite the first end that is subjected to the beam of light 102.

Once the position of maximum optical power 128 is identified and measured, the first end of the first moveable optical element 104 can then be further moved in one direction along the transverse plane (in the positive X direction for example) to identify a beam intensity that is a fixed amount down from the measurement obtained at the position of maximum optical power 128. In this example that fixed amount down could be 10 dB, thereby defining a first half-width 136 of the beam of light 102 at that first half-width point 140. By moving the first end of the first moveable optical element 104 in the opposite direction along the same transverse plane (in the negative X direction for example) a second half-width point 144 that measures the same fixed amount down can be identified. The distance in the negative X direction can be considered as a second half-width 148 of the beam of light 102.

Continuing with the current example, the beam width 152 in the transverse plane can be measured in several different ways. By way of example, and not limitation, the beam width 152 can be calculated (approximated) by measuring the distance between the first half-width point 140 and second half-width point 144, by adding the first half-width 136 to the second half-width 148, or by multiplying either half-width by two. Furthermore, extending the concept to three dimensions, one skilled in the art, upon consideration of this text, can see that a two-dimensional cross-section 156 of the beam of light 102 can be defined in the transverse plane at any Z location.

Next, the first end of the first moveable optical element 104 is moved iteratively to a new Z location (either in the positive or negative z-direction). At this new Z location, the position of maximum optical power is identified along with a new beam width (or a new cross-section). The three dimensional cone (beam) of light 102 can thereby be defined within the coordinate system at multiple Z locations.

Figure 2:
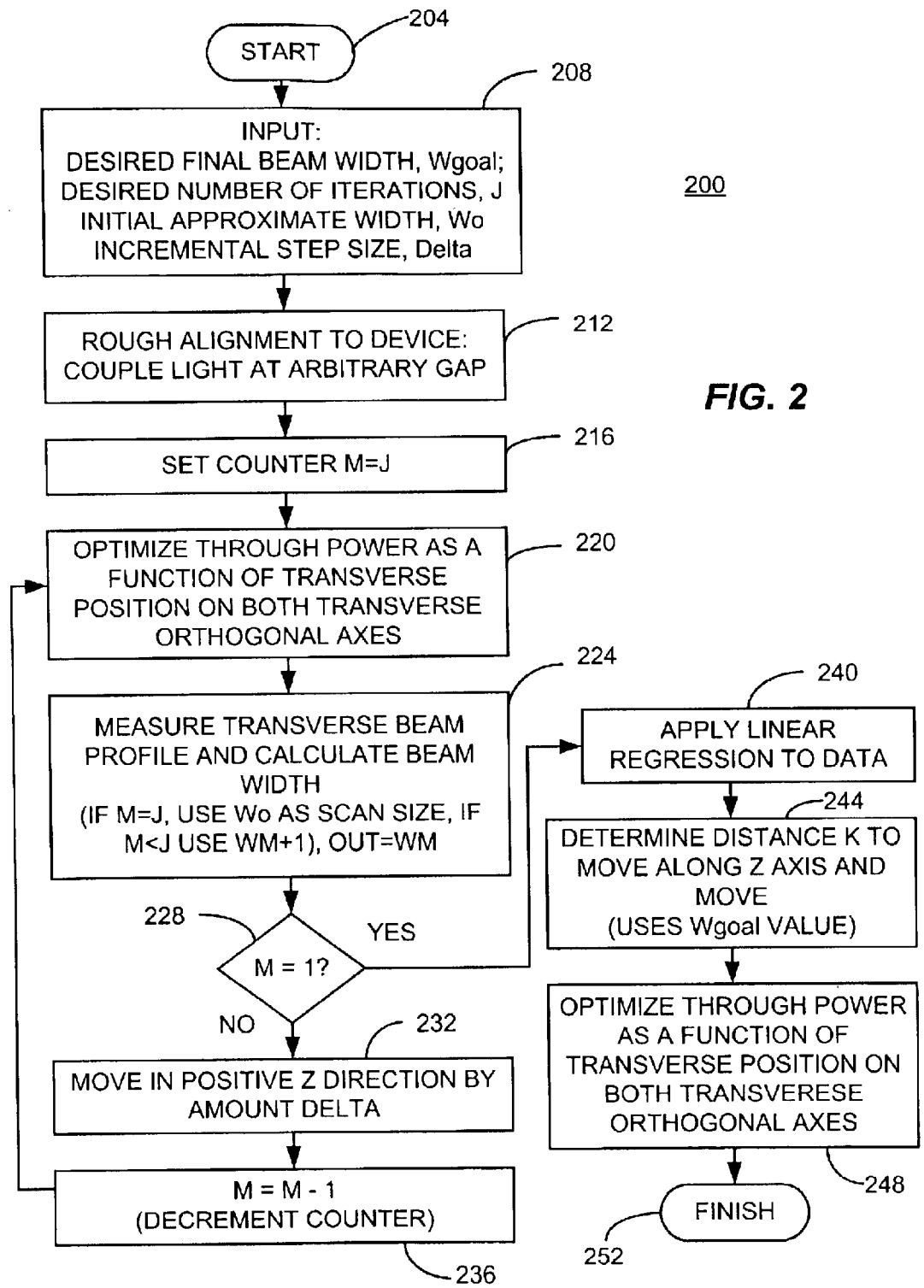
FIG. 2 is a flow chart depicting a method of optical element alignment consistent with certain embodiments of the present invention.

Turning now to FIG. 2, a cone method 200 for refining the position of a single end of an optical element within the beam (cone) of light 102 will now be discussed. It may be helpful to refer to FIG. 1 for insight into this discussion of FIG. 2 and the cone method 200. In this cone method 200, the first end of the first moveable optical element 104 can be placed optimally relative to an aperture of the second fixed optical element 108. The second fixed optical element 108 can have a transmitter 112 coupled to it such that it can emanate a beam of light 102 outwardly from the optical aperture. The second end of the first moveable optical element 104 can have a receiver 132 coupled to it in any fashion that allows optical power transmission through the first moveable optical element 104 to be measured.

This cone method 200 begins at 204. At 208, a determination of the calibrated/desired (target) final beam width 152 incidence on the first end of the first moveable optical element 104 and of the desired accuracy of the method (number of iterations) is done. Also, an initial approximate beam width and an incremental step size are selected. The determination of target final separation and desired accuracy can be based upon several characteristics, including but not limited to, beam shape of the beam of light 102, optical element characteristics, optical specifications for the media, etc. Using a coordinate system as defined above for measurement purposes, light can then be loosely coupled through the optical elements at 212 to provide a rough alignment by moving the first end of the first moveable optical element 104 into the beam of light 102 to allow transmission of light from the transmitter 112 to the receiver 132 through the first moveable optical element 104.

At 216, a counter value is established that can be used to implement the desired number of iterations of the measurement sequence. At 220, an optimization routine is run. This optimization routine at 220 is used to establish a transverse position (along both the X and Y transverse orthogonal axes) of the first end of the first moveable optical element 104 such that it has an optimized/maximum optical power transmission through it at that Z location. This optimization routine at 220 can be one of many possible solutions to determining the position of optimized/maximum power transmission.

By way of example, without limiting the scope of the invention, this determination of the optimized/maximum power transmission can be done by a sweeping movement of the first end of the first moveable optical element 104 perpendicular (normal) to the beam of light 102 in conjunction with time coordinated optical power measurement data collection at the receiver 132. Alternatively, a step-and-measure technique can be used to determine the optimized/maximum power transmission wherein the first end of the first moveable optical element 104 is sequentially moved perpendicular (normal) to the beam of light 102 from position to position with optical power measurements being taken at each position. Yet another alternative can be expressed as a seeking routine that measures the optical power in the transverse plane and decreases the stepsize of each subsequent movement in searching for the maximum optical power point (or a reduced optical power point, as appropriate) yielding a desired accuracy down to the minimum motion control step resolution of the motion control equipment. Any suitable device capable of moving the first end of the first moveable optical element 104 in the coordinate space can be used to facilitate the movements described under control of a suitable controller device (for example a programmed processor). As well, all movements can be manually controlled.

In either the sweeping or step-and-measure exemplary optical power optimizations mentioned above, the initial movement can be along one of the transverse axes (the X-axis 120 for this example) until the power level is measured as decreasing with continued movement. The direction of movement is then reversed. The movement continues in the opposite direction until a maximum measured optical power location along that transverse axis is recognized. The location of maximum measured optical power is found by noting an increase in measured optical power followed by a subsequent decrease in measured optical power. Once the location of maximum optical power along one transverse axis is found, the first end of the first moveable optical element 104 is moved back to the location of the maximum optical power measurement along that axis. The process is repeated along the other transverse axis (the Y-axis for this example) starting from the position of maximum optical power along the initial axis (the X-axis for this example). The intersection of the two maximum optical power measurements represents the position of maximum optical power in that transverse plane.

The first time through the loop, the resulting position of optimized/maximum power transmission through the first moveable optical element 104 can be considered as a starting point or a point of origin for all subsequent movement and measurements. During successive iterations through the loop, this point can be considered as the position of peak optical power at that axial Z location.

At 224, a transverse beam profile and beam width are calculated. The first end of the first moveable optical element 104 can be moved to a position along the transverse plane perpendicular to the beam of light 102 where the optical power transmission is a fixed amount down from the power measured at the position of peak optical power. By way of example, and not limitation, this fixed amount down can be a 10 dB reduction in optical power and the resulting position of that measurement can represent a half-width of the beam of light for measurement purposes. For the purposes of this discussion, and for ease of presentation, the term position of half-width, or similar terms, will be used when referring to such a position of reduced optical power. It should be clear to one skilled in the art upon consideration of this teaching that any suitable relative power level can be used.

A measurement of the distance from the position of peak optical power to the position of half-width is taken. This measurement can then be used to calculate the beam width 152 at that axial Z location. The calculation of the beam width 152 is done in this example by multiplying the measured distance by two. It should be clear to one skilled in the art, upon consideration of this teaching, that other measurements as discussed above for finding another half width in the opposite transverse direction can be used to ultimately determine the beam width 152. Furthermore, it should be clear to one skilled in the art, upon consideration of this teaching, that the presentation here results in a faster method for determining the half width 152, but it is not intended to limit the scope of the invention.

Another approach, at 224, for calculating a transverse beam profile and beam width is to move transversally away from the position of peak optical power along one transverse axis a distance that is half of the scan size (half of the initial approximation of beam width for the first iteration of the cone method 200). Once so positioned, then scan along the same transverse axis back through the position of peak optical power to an equidistant position along the transverse axis for the entire scan size. During this scan optical power measurements are taken. The output of this step is a measured beam width 152.

At 228, the counter value is tested to determine if the last iteration of the cone method 200 has just completed. If the last iteration of the cone method 200 has not just completed, a transition is made to 232. At 232 a movement in the positive Z direction is made by an amount initially selected at 208 for the incremental step size.

At 236 the counter value is decremented, thereby indicating that one measurement has been completed. A transition is then made to 220 and a new measurement sequence can be completed. In the above and subsequent discussions, a counter value is indicated to be decremented and tested to determine how certain elements of the invention behave. It should be noted that a counter value can just as easily be incremented and tested without departure from the present invention.

The cone method 200 continues, as discussed above, from 220 to 224 and subsequently to 228. It may be worthwhile to note at this point in the discussion, that once two sets of beam width 152 measurements have been completed, two straight-line equations can be constructed with the data that represent the two edges of the beam of light 102. As well, once two sets of beam width 152 measurements have been obtained, the data can be used to further guide step sizes, safety limitations, and error checking.

For ease of presentation, and without limitation, the cone method 200 is presented with a transition to 240 after the last iteration of the measurement and movement sequence. At 240, linear regression is applied to the collection of measurements acquired above to predict the final movement of the first end of the first moveable optical element 104. Linear regression is used to determine the Z location with the desired final beam width.

Variations on this method are anticipated by this description. For example, as mentioned above mathematical refinement of the method by way of using the data to further guide step sizes, safety limitations, and error checking can be done once two data sets are collected, and linear regression can be applied at this point as well. For ease of presentation, linear regression is applied after the iterative portion of the method has completed.

From 240, the cone method 200 continues to 244 where a distance to the final Z location is determined and movement of the first end of the first moveable optical element 104 to that Z location is done. The first end of the first moveable optical element 104 is now situated at the computed final axial Z location (aperture spacing) with the target final beam width.

It is worth noting that the final movement can be the calculated distance (K) to the final axial Z position minus a variable delta (a percentage of the total distance). By applying a movement of the final distance from the current axial Z position minus a delta value, the cone method 200 approaches the final axial Z position with increasing accuracy.

At 248, a final optimization can be run to radially position the first end of the first moveable optical element 104 at the position of peak optical power at the target final beam width. At 252, the cone method 200 ends.

In order to understand the calculations involved in implementing the present invention, consider the following sets of data from measurements done in accordance with cone method 200:

| | | | |
|---|---|---|---|
| Data set 1: Z1, | X1, | −X1, | W1 |
| Data set 2: Z2, | X2, | −X2, | W2 |
| Data set 3: Z3, | X3, | −X3, | W3 |
| Data set 4: Z4, | X4, | −X4, | W4 |

Each data set corresponds to measurements taken at a Z location Z1 through Z4. Each data set uses the X-axis as a transverse axis for purposes of representing the measurements. In each of the data sets, the first element represents the measurement of the Z location. The second element represents the transverse measurement in the positive X direction. The third element represents the measured or calculated value of the transverse measurement in the negative X direction. The fourth element represents the calculated beam width 152 at that Z location.

Two straight-line equations can be derived from the data sets. The equations are:

$$X^+ = m^+ Z + b^+ \qquad \text{EQN. 1}$$

$$X^- = m^- Z + b^- \qquad \text{EQN. 2}$$

where EQN. 1 represents a positive sloping line and EQN. 2 represents a negative sloping line with the X-axis being the dependent axis and the Z-axis being the independent axis. By subtracting EQN. 2 from EQN. 1, EQN. 3 results as is shown below. EQN. 3 can be set equal to a variable (W) that represents the distance between the two lines. This relationship is shown as EQN. 4 below.

$$(m^+ - m^-)Z + (b^+ - b^-) \qquad \text{EQN. 3}$$

$$W = (m^+ - m^-)Z + (b^+ - b^-) \qquad \text{EQN. 4}$$

With an equation for the distance (W) between the two lines established in terms of the variable Z, EQN. 4 can be solved for the variable Z in terms of distance (W) and EQN. 5 results as is shown below.

$$Z = \{W - (b^+ - b^-)\}/(m^+ - m^-) \qquad \text{EQN. 5}$$

The target value for the beam width (W) can be substituted into EQN. 5 and EQN. 5 can be solved for the Z location with that target beam width.

Based upon the preceding explanation, one skilled in the art, should now be able to understand the mathematics involved in and the physical nature of this embodiment of this invention.

In order to further help with the understanding of the cone method 200, one variant of this cone method 200 can be described by the following pseudo code:

---

Set W = Final Beam Width, Set M = Desired Accuracy,
Set $X^{start}$ = Initial Scan Distance, Set $T^{move}$ = Initial Scan Time
Set N = Initial Data Acquisition Count
Loop M times
Optimize Power in X&Y plane, Ending at Maximum power position.
Measure Beam width:
    Offset to $-X^{start}/2$ from current X location.
    Set Velocity to $X^{start}/T^{move}$.
    Execute Movement from current X location to $+X^{start}/2$.
    Sample Data Acquisition Card for Duration $T^{move}$ with N points.
    Return Data for analysis.
Data Analysis:
    X[Array]= {$X^{not}$, $X^{not}$+dX, $X^{not}$+2dX, $X^{not}$+3dX, . . . },
    dX = $X^{start}$/(N−1)
    Data[array] is paired with X[Array] to generated Power Function
    Spline of Power function determines plus and minus fifty percent
        location within the Power Function
    Output is Width
    IF Width = W END,
    ELSE Set all variables for next scan and Increment forward in Z and
        return to beginning of Loop

---

Figure 3:
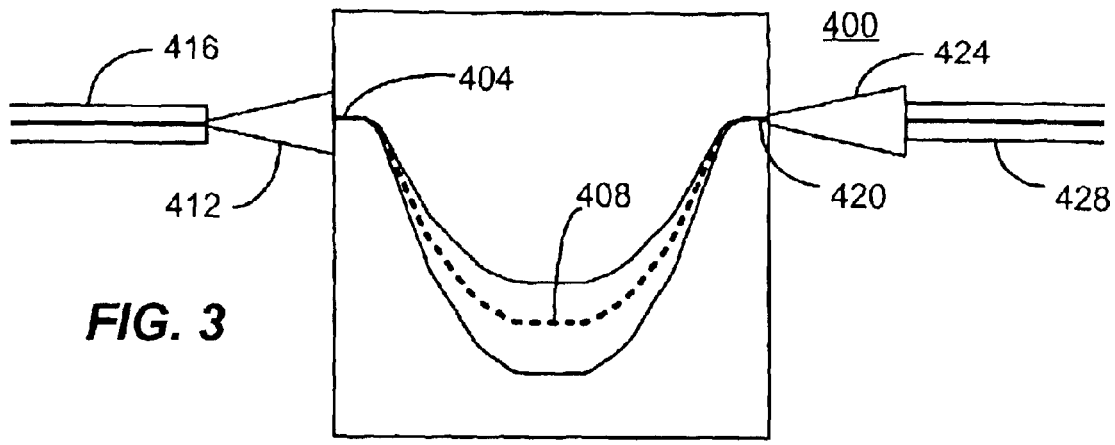
FIG. 3 is a diagram of an optical alignment environment consistent with certain embodiments of the present invention.
Figure 4:
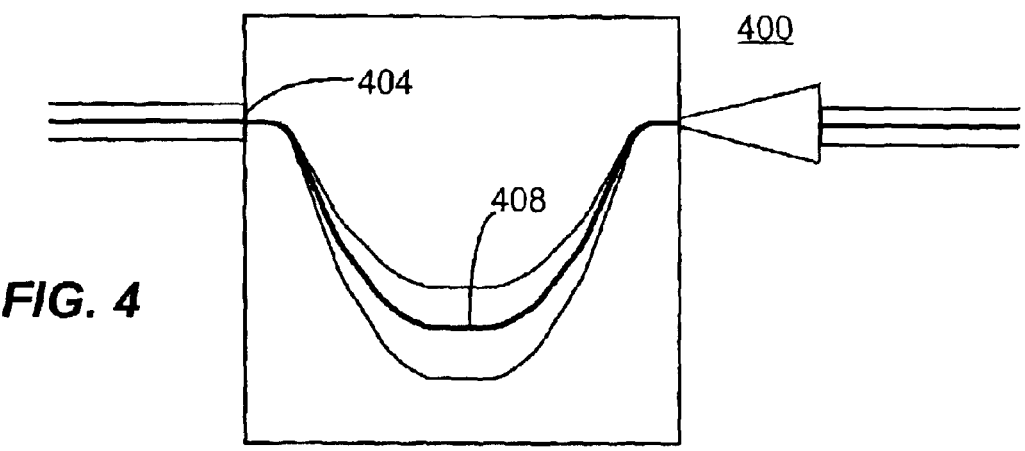
FIG. 4 is a diagram of an optical alignment environment with a first end of an optical element optimized for placement in the optical alignment environment consistent with certain embodiments of the present invention.
Figure 5:
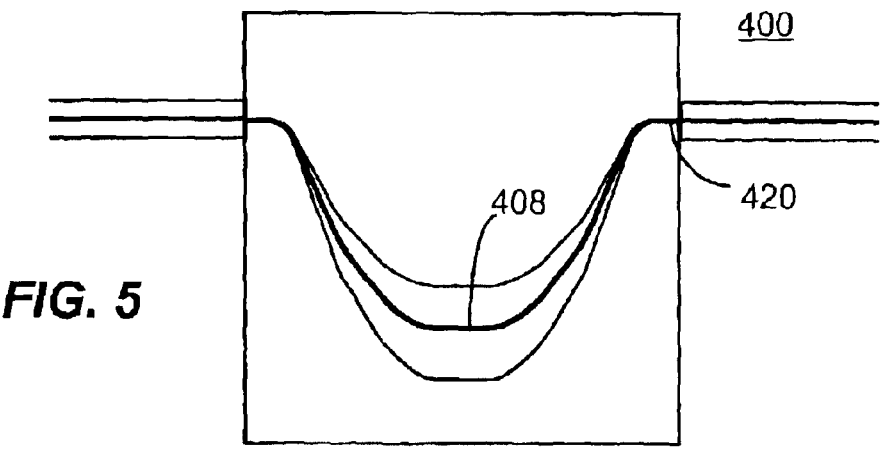
FIG. 5 is a diagram of an optical alignment environment with both a first end and a second end optimized for placement in the optical alignment environment consistent with certain embodiments of the present invention.

Turning now to FIG. 3 viewed in conjunction with FIG. 4 and FIG. 5, an exemplary alignment environment 400 is presented and can now be discussed in the context of the foregoing disclosure. It should be noted that for ease of presentation, the following discussion suggests that certain elements are moveable and that certain other elements are stationary. While designating certain elements as moveable and certain other elements as stationary is helpful for presentation, this is not intended to be construed as a limitation. In each situation where one element is designated to be moveable and the other element as stationary, this discussion is intended to fully encompass the situation where the moveable and stationary elements are reversed, as well as the situation where both elements move relative to one another.

In the alignment environment 400, a first moveable end 404 of a first optical element 408 can be brought into a position relative to a beam of light 412 that emanates from a stationary optical element 416 such that light can pass into the first optical element 408. The second stationary end 420 of the first optical element 408 can then emanate a beam of light 424. A third moveable optical element 428 that has coupled to it equipment with the ability to perform optical power measurements can then be brought into a position relative to the beam of light 424 that emanates from the second stationary end 420 of the first optical element 408 such that light can pass into the third moveable optical element 428.

The alignment environment 400 can then be used in conjunction with any optical power optimization method, such as those exemplary methods discussed above, to align the axial separation and radial position of the optical apertures at both ends of the first optical element 408. By first optimizing the position and aperture spacing at one end of the first optical element 408 and then optimizing the position and aperture spacing at other end of the first optical element 408, the first optical element 408 will be optimally functional for its intended purpose.

Turning now to FIG. 4, the alignment environment 400 has been used in conjunction with any optical power optimization method, such as those exemplary methods discussed above, to optimize the position and aperture spacing at the first moveable end 404 of the first optical element 408.

Turning now to FIG. 5, the alignment environment 400 has been used in conjunction with any optical power optimization method, such as those exemplary methods discussed above, to optimize the position and aperture spacing at the second stationary end 420 of the first optical element 408 and optimal optical power transmission through the apertures has been achieved.

Figure 6:
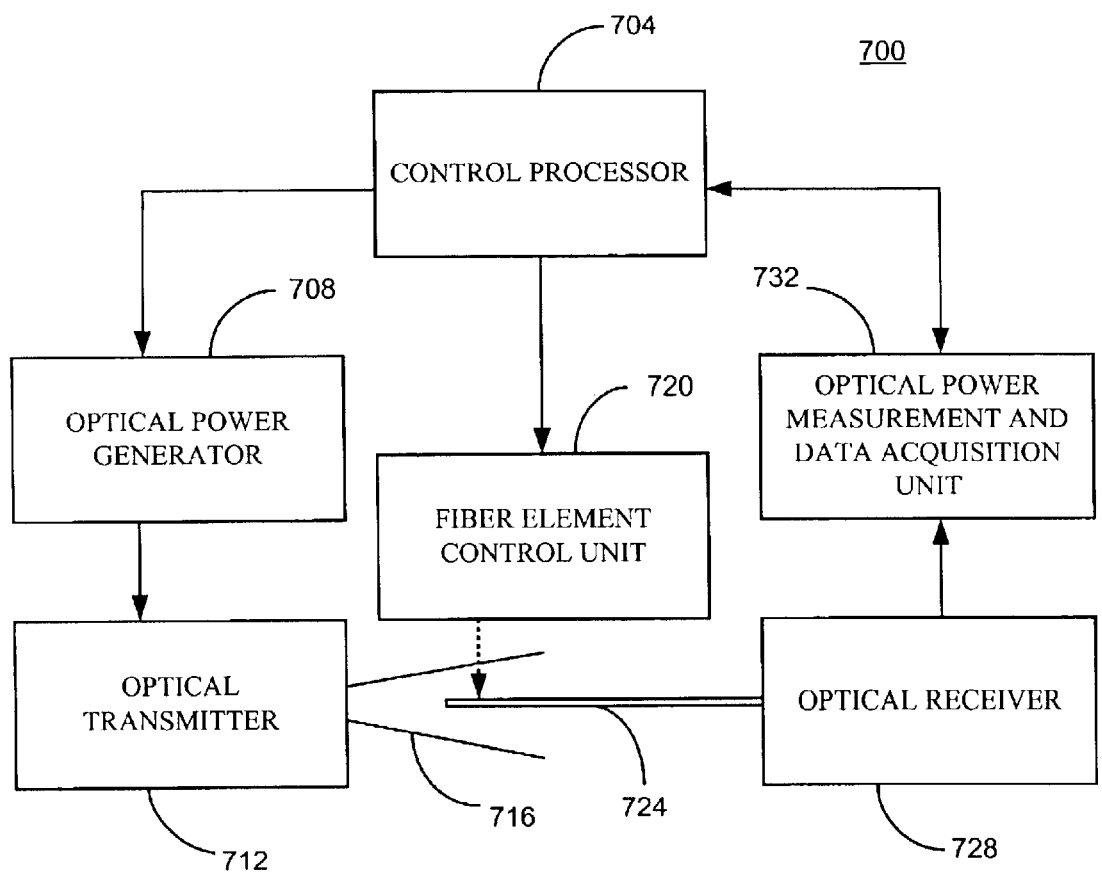
FIG. 6 is a block diagram of an optical alignment system consistent with certain embodiments of the present invention.

Turning now to FIG. 6, an exemplary computer-controlled optical alignment system 700 is shown and can now be discussed. A control processor 704 controls an optical power generation device 708 that is coupled to an optical transmitter 712. When the control processor 704 instructs the optical power generation device 708 to generate optical power, the optical transmitter 712 emits a beam of light 716 suitable for use in optical alignment.

The control processor 704 also controls a fiber element control unit 720 that is capable of moving a first end of a moveable fiber optic element 724 transversally and axially in relation to the beam of light 716. When the control processor 704 instructs the fiber element control unit 720 to move the first end of the moveable fiber optic element 724 in any direction under its control, fiber element control unit 720 moves the first end of the moveable fiber optic element 724 the desired distance in the desired direction.

The desired distance of the movement and desired direction are determined through optical power measurement. The optical power measurement is accomplished through an optical receiver 728. The optical receiver 728 is coupled to the second end of the moveable fiber optic element 724. The optical receiver 728 also couples to an optical power measurement and data acquisition unit 732 which measures and records the optical power transmitted through the moveable fiber optic element 724. When the control processor 704 instructs the optical power measurement and data acquisition unit 732 to take a measurement, a record is created that indicates the optical power measured at that time. The control processor 704 can then read the optical power measurement from the optical power measurement and data acquisition unit 732.

The control processor 704 subsequently instructs the fiber element control unit 720 to move the first end of the moveable fiber optic element 724 in accordance with any of the methods contemplated by this invention to achieve a final position of the first end of the moveable fiber optic element 724 as indicated above.

It should be noted that in the examples above specific components were identified. Many other components could be substituted in the above text and examples without departing from the present invention. For example only, and not limitation, optical fiber strands, optical fiber arrays, optical fiber cables, optical filters, optical amplifiers, optical waveguide devices, or any other optical component that can exist in an optical system that can be used to transmit, carry, manipulate, or receive optical energy, can be used without departing from the present invention. Furthermore, any method that utilizes optical power measurement and/or characterization for optical alignment should be considered to be within the scope of this invention.

As mentioned in the background section of this document, prior solutions to aligning optical fiber and optical fiber arrays generally rely upon detection of a physical edge of a first fiber with a camera, force feedback, or linear encoding. This invention allows predictable measurement of optical element to optical element distance and alignment without dependence upon knowledge of the physical edge of the fiber or device. The present invention, in accordance with certain embodiments, can be practiced without reliance upon edge detection, either visually or with contact. This method uses measurements of beam shape characteristics, thereby allowing any form factor of the device or fiber to be used with the invention.

Certain embodiments of this invention have the potential advantages of non-contact axial distance alignment of the optical elements; non-contact radial alignment of the optical elements; no equipment beyond the optical fiber transmission system is required; it offers a high optical power repeatability through the elements; it offers a high spatial resolution of the of optical element placement; and it is independent of physical form factor, imperfections, and manufacturing tolerances. It will become apparent to one skilled in the art upon consideration of this teaching that many other uses for the invention and advantages of the invention exist.

Those skilled in the art will recognize that the present invention has been described in terms of exemplary embodiments. The present invention can be carried out under computer control based upon use of a programmed processor, for example 704 for FIG. 6. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention. Furthermore, the movement actions can be done manually.

Those skilled in the art will appreciate that the program steps and associated data used to implement the embodiments described above can be implemented using disc storage as well as other forms of storage such as for example Read Only Memory (ROM) devices, Random Access Memory (RAM) devices, optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, can be implemented using a programmed processor executing programming that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications, permutations, and variations as fall within the scope of the appended claims.

What is claimed is:

1. A method of fiber optic alignment, wherein a target beam width of a beam of light is defined along a path of said beam of light on a first end of a fiber optic element, and wherein said fiber optic element is situated with light incident upon said first end of said fiber optic element, comprising:

measuring a beam width at multiple locations axially relative to said beam of light;

calculating a location axially relative to said beam of light wherein said beam of light has a beam width that equals said target beam width of said beam of light; and moving said fiber optic element to said location.

2. A method of fiber optic alignment as in claim 1, wherein calculating said location axially relative to said beam of light with said target beam width incidence of said beam of light is done by linear regression using data created from said measuring of said beam width.

3. A method of fiber optic alignment as in claim 1, wherein calculating said location axially relative to said beam of light with said target beam width incidence of said beam of light is done by interpolation using data created from said measuring of said beam width.

4. A method of fiber optic alignment as in claim 1, wherein calculating said location axially relative to said beam of light with said target beam width incidence of said beam of light is done by extrapolation using data created from said measuring of said beam width.

5. A method of fiber optic alignment as in claim 1, wherein measuring said beam width is done in a two-dimensional transverse plane perpendicular to said path of said beam of light at multiple locations axially relative to said beam of light.

6. A method of fiber optic alignment as in claim 5, wherein measuring said beam width at any of said multiple locations comprises:

moving said first end of said fiber optic element to a location axially relative to said beam of light;

moving said first end of said fiber optic element along a transverse perpendicular path to said path of said beam of light;

determining a position of peak optical power along said transverse path at said location axially relative to said beam of light;

moving said first end of said fiber optic element to said position of peak optical power;

recording said position of peak optical power;

measuring a peak optical power at said position of peak optical power;

moving said first end of said fiber optic element along said transverse path to a leading transverse position with a reduced optical power that measures a fixed amount down from said peak optical power;

recording said leading transverse position;

calculating a distance between said position of peak optical power and said leading transverse position; and determining said beam width at said location by multiplying said distance by two.

7. A method of fiber optic alignment as in claim 6, wherein determining said beam width at said location further comprises:

moving said first end of said fiber optic element transversally relative to said path of said beam of light from said leading transverse position through said position of peak optical power to a trailing transverse position with a power level equal to said reduced optical power at said leading transverse position;

recording said trailing transverse position;

calculating a distance between said leading transverse position and said trailing transverse position; and determining said beam width at said location as said distance between said leading transverse position and said trailing transverse position.

8. A method of fiber optic alignment as in claim 6, wherein measuring said beam width at any of said multiple locations further comprises measuring a transverse beam profile.

9. A method of fiber optic alignment as in claim 1, wherein measuring said beam width is done along a one-dimensional transverse line perpendicular to said path of said beam of light at multiple locations axially relative to said beam of light.

10. A method of fiber optic alignment as in claim 9, wherein measuring said beam width at any of said multiple locations comprises:

moving said first end of said fiber optic element to a location axially relative to said beam of light;

moving said first end of said fiber optic element along a transverse path to said path of said beam of light;

determining a position of peak optical power along said transverse path at said location axially relative to said beam of light;

moving said first end of said fiber optic element to said position of peak optical power;

recording said position of peak optical power;

measuring a peak optical power at said position of peak optical power;

moving said first end of said fiber optic element along said transverse path to a leading transverse position with a reduced optical power that measures a fixed amount down from said peak optical power;

recording said leading transverse position;

calculating a distance between said position of peak optical power and said leading transverse position; and determining said beam width at said location by multiplying said distance by two.

11. A method of fiber optic alignment as in claim 10, wherein determining said beam width at said location further comprises:

moving said first end of said fiber optic element transversally relative to said path of said beam of light from said leading transverse position through said position of peak optical power to a trailing transverse position with a power level equal to said reduced optical power at said leading transverse position;

recording said trailing transverse position;

calculating a distance between said leading transverse position and said trailing transverse position; and determining said beam width at said location as said distance between said leading transverse position and said trailing transverse position.

12. A method of fiber optic alignment as in claim 10, wherein measuring said beam width at any of said multiple locations further comprises measuring a perpendicular optical power two-dimensional curve axially relative to said beam of light.

13. An electronic storage medium storing instructions that, when carried out using a programmed processor, carries out a method of fiber optic alignment, wherein a target beam width of a beam of light is defined along a path of said beam of light on a first end of a fiber optic element, and wherein said fiber optic element is situated with light incident upon said first end of said fiber optic element, the method comprising:

measuring a beam width at multiple locations axially relative to said beam of light;

calculating a location axially relative to said beam of light wherein said beam of light has a beam width that equals said target beam width of said beam of light; and moving said fiber optic element to said location.

14. An apparatus for fiber optic alignment, comprising:

a control processor;

means responsive to said control processor for moving a first end of a fiber optic element within a beam of light;

means for measuring at a second end of said fiber optic element optical power transmitted through said fiber optic element and providing an optical power measurement to said control processor; and said control processor carrying out instructions that:

measure a beam width at multiple locations axially relative to said beam of light;

calculate a location axially relative to said beam of light wherein said beam of light has a beam width that equals said target beam width of said beam of light; and moves said fiber optic element to said location.

15. An apparatus for fiber optic alignment as in claim 14, wherein said control processor further carries out instructions that calculate said location axially relative to said beam of light with said target beam width of said beam of light is done by linear regression using data created from said control processor carrying out said instructions that measure said beam width at said multiple locations axially relative to said beam of light.

16. An apparatus for fiber optic alignment as in claim 14, wherein said control processor carries out instructions that calculate said location axially relative to said beam of light with said target beam width of said beam of light is done by interpolation using data created from said control processor carrying out said instructions that measure said beam width at said multiple locations axially relative to said beam of light.

17. An apparatus for fiber optic alignment as in claim 14, wherein said control processor carries out instructions that calculate said location axially relative to said beam of light with said target beam width of said beam of light is done by extrapolation using data created from said control processor carrying out said instructions that measure said beam width at said multiple locations axially relative to said beam of light.

18. An apparatus for fiber optic alignment as in claim 14, wherein said control processor carries out instructions that measure said beam width at said multiple locations axially relative to said beam of light by:

determining a position of peak optical power along said transverse path at said location axially relative to said beam of light;

moving said first end of said fiber optic element to said position of peak optical power;

recording said position of peak optical power;

measuring a peak optical power at said position of peak optical power;

moving said first end of said fiber optic element along said transverse path to a leading transverse position with a reduced optical power that measures a fixed amount down from said peak optical power;

recording said leading transverse position;

calculating a distance between said position of peak optical power and said leading transverse position; and determining said beam width at said location by multiplying said distance by two.

19. An apparatus for fiber optic alignment as in claim 18, wherein said control processor carries out instructions that measure said beam width at said multiple locations axially relative to said beam of light by:

moving said first end of said fiber optic element transversally relative to said path of said beam of light from said leading transverse position through said position of peak optical power to a trailing transverse position with a power level equal to said reduced optical power at said leading transverse position;

recording said trailing transverse position;

calculating a distance between said leading transverse position and said trailing transverse position; and determining said beam width at said location as said distance between said leading transverse position and said trailing transverse position.

20. An apparatus for fiber optic alignment, comprising:

a light source that transmits a beam of light;

means for measuring optical power transmission through a fiber optic element;

means for moving said fiber optic element radially within said beam of light;

means for moving said fiber optic element axially within said beam of light;

means for calculating a position of said fiber optic element in a transverse plane relative to said beam of light with a peak optical power transmission through said fiber optic element;

means for calculating a position of said fiber optic element in said transverse plane relative to said beam of light with a reduced optical power intensity of said beam of light;

means for calculating a beam width of said beam of light at multiple locations axially relative to said beam of light;

means for calculating a location of said fiber optic element axially relative to said beam of light wherein said beam of light has a beam width that equals a target beam width of said beam of light; and, means for moving said fiber optic element to said location.

* * * * *